United States Patent
Kanei et al.

(10) Patent No.: US 11,346,332 B2
(45) Date of Patent: May 31, 2022

(54) PISTON RING AND COMPRESSOR

(71) Applicant: KOBE STEEL, LTD., Hyogo (JP)

(72) Inventors: Naofumi Kanei, Takasago (JP);
Tomohiro Otsuka, Takasago (JP);
Hirotaka Ito, Kobe (JP); Hiroaki Nii,
Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 8 days.

(21) Appl. No.: 17/046,167

(22) PCT Filed: Apr. 8, 2019

(86) PCT No.: PCT/JP2019/015250
§ 371 (c)(1),
(2) Date: Oct. 8, 2020

(87) PCT Pub. No.: WO2019/208182
PCT Pub. Date: Oct. 31, 2019

(65) Prior Publication Data
US 2021/0156371 A1 May 27, 2021

(30) Foreign Application Priority Data

Apr. 27, 2018 (JP) .............................. JP2018-087262

(51) Int. Cl.
*F04B 39/00* (2006.01)
*F16J 9/16* (2006.01)
*F16J 9/20* (2006.01)

(52) U.S. Cl.
CPC ............. *F04B 39/0022* (2013.01); *F16J 9/16* (2013.01); *F05C 2225/04* (2013.01); *F16J 9/20* (2013.01)

(58) Field of Classification Search
CPC ............ F04B 39/0022; F04B 39/042; F04B 39/0284; F16J 9/16; F16J 9/20; F16J 9/08;
(Continued)

(56) References Cited

U.S. PATENT DOCUMENTS 5,392,692 A * 2/1995 Rao .......................... F16J 9/16
277/442
5,490,445 A * 2/1996 Rao .......................... F16J 1/08
123/193.6
(Continued)

FOREIGN PATENT DOCUMENTS

JP    S60-129551 U   8/1985
JP    2003-206860 A  7/2003
(Continued)

OTHER PUBLICATIONS

Machine translation of Detailed Description for S60-129551, Ebisu et al., published Aug. 30, 1985, obtained from https://www.j-platpat.inpit.go.jp/, pp. 1-2. (Year: 1985).*

(Continued)

*Primary Examiner* — Grant Moubry
(74) *Attorney, Agent, or Firm* — Studebaker & Brackett PC

(57) ABSTRACT

A piston ring includes a first ring portion which is fitted onto an outer circumferential portion of a piston and which is capable of sliding relative to an inner wall surface of a cylinder, and a second ring portion which is fitted onto the outer circumferential portion of the piston, arranged side-by-side with the first ring portion in the axial direction, and which is capable of sliding relative to the inner wall surface of the cylinder. The second ring portion is fitted onto the outer circumferential portion of the piston in such a way as to be positioned on a side opposite to a compression chamber inside the cylinder, relative to the first ring portion, and has a greater hardness than the first ring portion has.

9 Claims, 6 Drawing Sheets

(58) Field of Classification Search
CPC ......... F16J 9/28; F16J 9/06; F02F 5/00; F05C 2225/04
See application file for complete search history.

(56) References Cited

U.S. PATENT DOCUMENTS

| | | | | |
|---|---|---|---|---|
| 5,839,353 | A * | 11/1998 | Mecham | F16J 1/008 |
| | | | | 92/258 |
| 6,428,014 | B2 * | 8/2002 | Scarlett | F16J 9/16 |
| | | | | 277/435 |
| 8,403,335 | B2 * | 3/2013 | Sueyoshi | F16J 15/164 |
| | | | | 277/437 |
| 2001/0045703 | A1 * | 11/2001 | Scarlett | F16J 9/16 |
| | | | | 277/459 |
| 2003/0006562 | A1 * | 1/2003 | Feistel | F16J 9/28 |
| | | | | 277/434 |
| 2005/0051970 | A1 | 3/2005 | Edelmann | |
| 2006/0249913 | A1 * | 11/2006 | Nessa | F16J 9/16 |
| | | | | 277/493 |
| 2009/0289421 | A1 * | 11/2009 | Liour | F02F 3/00 |
| | | | | 277/434 |
| 2013/0154197 | A1 * | 6/2013 | Feistel | F16J 15/24 |
| | | | | 277/449 |
| 2014/0090554 | A1 * | 4/2014 | Chalk | F16J 9/16 |
| | | | | 92/172 |
| 2015/0007791 | A1 * | 1/2015 | Dellora | F16J 9/14 |
| | | | | 123/193.4 |
| 2016/0047612 | A1 * | 2/2016 | Sullivan | F41A 13/12 |
| | | | | 89/191.01 |
| 2017/0321803 | A1 * | 11/2017 | Meacham | F16J 9/20 |

FOREIGN PATENT DOCUMENTS

| | | |
|---|---|---|
| JP | 2014-178037 A | 9/2014 |
| JP | 6068016 B2 | 1/2017 |

OTHER PUBLICATIONS

Notification of Transmittal of Translation of the International Preliminary Report on Patentability and Translation of Written Opinion of the International Searching Authority; PCT/JP2019/015250; dated Nov. 5, 2020.

* cited by examiner

PISTON RING AND COMPRESSOR

TECHNICAL FIELD

The present invention relates to a piston ring and a compressor provided with the piston ring.

BACKGROUND ART

Conventionally, as disclosed in Patent Literatures 1 to 3, in a reciprocating compressor and the like, a piston ring is used for sealing a gap between an outer circumferential portion of a piston and an inner wall surface of a cylinder. By fitting the piston ring onto the outer circumferential portion of the piston, it is possible to prevent gas in a compression chamber of the cylinder from leaking through the gap between the outer circumferential portion of the piston and the inner wall surface of the cylinder.

Patent Literatures 1 and 2 disclose a piston ring provided with one ring member that is substantially L-shaped viewed in cross section and the other ring member that is put into the one ring member. Furthermore, Patent Literature 3 discloses a piston ring formed of modified polytetrafluoroethylene.

The piston rings disclosed in Patent Literatures 1 to 3 receive pressure of gas flowing from the compression chamber into the gap between the outer circumferential portion of the piston and the inner wall surface of the cylinder, and sometimes deform by this pressure so as to protrude to a low pressure side. That is, the conventional piston rings may deform without being able to withstand the pressure of the gas flowing in from the compression chamber, thereby causing a problem that the sealing property of the piston ring is impaired.

CITATION LIST

Patent Literatures

Patent Literature 1: Japanese Patent Laid-Open No. 2003-49945
Patent Literature 2: Japanese Patent Laid-Open No. 2005-83578
Patent Literature 3: Japanese Patent No. 6068016

SUMMARY OF INVENTION

An object of the present invention is to provide a piston ring capable of more reliably sealing a gap between an outer circumferential portion of a piston and an inner wall surface of a cylinder, and a compressor provided with the piston ring.

A piston ring according to one aspect of the present invention is for sealing a gap between the outer circumferential portion of the piston and the inner wall surface of the cylinder, in a compressor provided with the cylinder and the piston reciprocating in an axial direction in the cylinder. The piston ring includes a first ring portion which is fitted onto the outer circumferential portion of the piston and which is capable of sliding relative to the inner wall surface of the cylinder, and a second ring portion which is fitted onto the outer circumferential portion of the piston, arranged side-by-side with the first ring portion in the axial direction, and which is capable of sliding relative to the inner wall surface of the cylinder. The second ring portion is fitted onto the outer circumferential portion of the piston in such a way as to be positioned on a side opposite to a compression chamber inside the cylinder, relative to the first ring portion, and has a greater hardness than the first ring portion has.

According to the present invention, it is possible to provide a piston ring capable of more reliably sealing a gap between an outer circumferential portion of a piston and an inner wall surface of a cylinder, and a compressor provided with the piston ring.

DESCRIPTION OF EMBODIMENTS

Hereinafter, the piston ring according to the embodiment of the present invention and the compressor provided with the piston ring will be described in detail with reference to the drawings.

First Embodiment

<Compressor>

Figure 1:
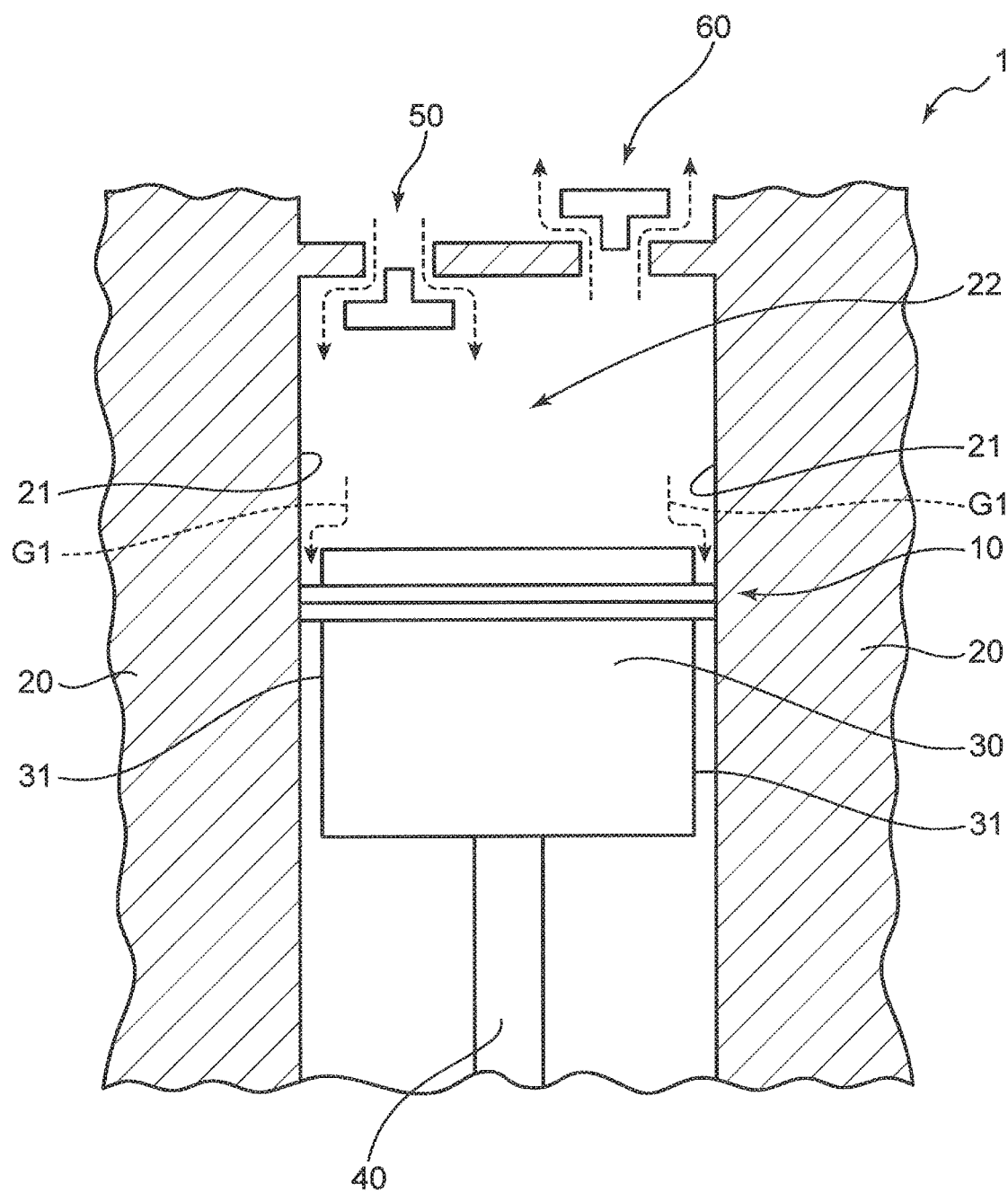
FIG. 1 is a cross sectional view schematically showing the configuration of a compressor according to a first embodiment of the present invention.

First, the configuration of a compressor 1 according to the first embodiment of the present invention will be described with reference to FIG. 1. FIG. 1 is a cross sectional view schematically showing the configuration of the vicinity of a piston 30 in the compressor 1. It is to be noted that FIG. 1 shows only some components of the compressor 1, and the compressor 1 can be provided with any other components not shown in FIG. 1.

The compressor 1 is a reciprocating compressor that pressurizes gas sucked into a cylinder 20 through a suction valve 50 by the piston 30 and discharges the pressurized gas through a discharge valve 60. As shown in FIG. 1, the compressor 1 is mainly provided with the cylinder 20, the piston 30, a piston rod 40, and a piston ring 10. Although not shown, the compressor 1 is further provided with a crankshaft, a connecting rod, and a crosshead.

The compressor 1 in the present embodiment is used in a hydrogen station, which is a facility that fills a fuel cell vehicle with hydrogen gas as fuel. That is, hydrogen gas compressed to a high pressure state (e.g., equal to or greater than 35 MPa or equal to or greater than 40 MPa) by the compressor 1 can be supplied to a dispenser, and the hydrogen gas can be filled to the fuel cell vehicle from the dispenser. However, the purpose of the compressor of the present invention is not limited thereto. Hereinafter, each component of the compressor 1 according to the present embodiment will be described below.

The cylinder 20 has, for example, a cylindrical shape, and has a compression chamber 22 for pressurizing gas. As shown in FIG. 1, the cylinder 20 has an inner wall surface 21, and the compression chamber 22 is surrounded by the inner wall surface 21. By changing the volume of the compression chamber 22 by the reciprocating motion of the piston 30, the gas sucked into the compression chamber 22 is pressurized.

The cylinder 20 is made of a steel material containing Cr such as SUH660 of JIS standard, SUS316 (including a passive film) of JIS standard, and SA-638M (GRADE 660) of ASME standard. A natural oxide film of Cr is formed on the inner wall surface 21 of the cylinder 20. It is to be noted that in the compressor of the present invention, the constituent material of the cylinder is not particularly limited.

The arithmetic average roughness (Ra) on the inner wall surface 21 of the cylinder 20 is equal to or less than 0.8. This enables the piston ring 10 to smoothly slide relative to the inner wall surface 21 of the cylinder 20 at the time of reciprocating motion of the piston 30. It is to be noted that the compressor of the present invention is not limited to the one in which Ra on the inner wall surface of the cylinder falls within the above range.

The piston 30 has a columnar shape having an outer diameter smaller than the inner diameter of the cylinder 20, and has an outer circumferential portion 31 radially (right and left direction in FIG. 1) facing the inner wall surface 21 of the cylinder 20. As shown in FIG. 1, a gap having a predetermined radial width is formed between the outer circumferential portion 31 of the piston 30 and the inner wall surface 21 of the cylinder 20.

The piston 30 is configured to reciprocate axially (up and down direction in FIG. 1) in the cylinder 20. Specifically, the rotational motion of a motor (not shown) is converted into an axial reciprocating motion of the piston rod 40 via the crankshaft and the connecting rod, thereby allowing the piston 30 attached to the tip of the piston rod 40 to reciprocate in the axial direction. The reciprocating motion of the piston 30 changes the volume of the compression chamber 22, and it is possible to repeat the suction of gas into the compression chamber 22 and the compression of the sucked gas.

The piston ring 10 is a component for sealing the gap between the outer circumferential portion 31 of the piston 30 and the inner wall surface 21 of the cylinder 20. The piston ring 10 is fitted onto the outer circumferential portion 31 of the piston 30 and slides relative to the inner wall surface 21 of the cylinder 20 at the time of reciprocating motion of the piston 30.

Leakage of a gas G1 from the compression chamber 22 can be prevented by sealing the gap by the piston ring 10. The compressor 1 according to the present embodiment is characterized by the configuration of the piston ring 10, which will be described in detail below.

<Piston Ring>

Figure 2:
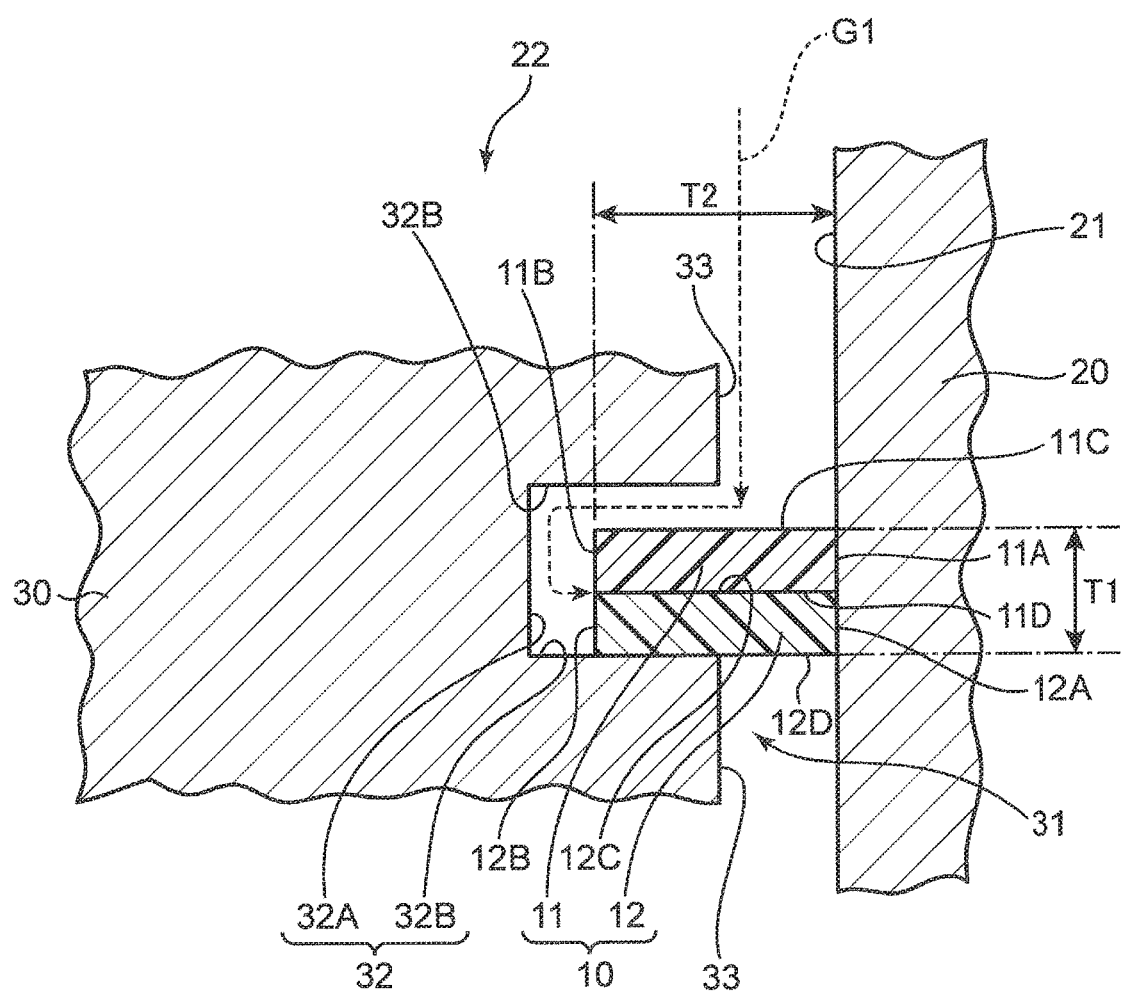
FIG. 2 is a cross sectional view schematically showing the configuration of a piston ring according to the first embodiment of the present invention.

FIG. 2 shows in detail the configuration of a sliding portion between the piston ring 10 and the inner wall surface 21 of the cylinder 20. The cross section of the piston ring 10 in FIG. 2 corresponds to the cross section along a line segment II-II in FIG. 4. As shown in FIG. 2, a groove 32 recessed in an orientation radially away from the inner wall surface 21 of the cylinder 20 is formed on the outer circumferential portion 31 of the piston 30. The groove 32 includes an axially extending groove bottom surface 32A and a pair of radially extending groove wall surfaces 32B connected to the groove bottom surface 32A, and is formed annularly over the entire circumferential direction of the piston 30.

In the following description, the groove wall surface 32B of the upper side in FIG. 2 is sometimes referred to as a "top side groove wall surface" and the groove wall surface 32B of the lower side in FIG. 2 is sometimes referred to as a "bottom side groove wall surface". As shown in FIG. 2, an axially extending outer circumferential surface 33 positioned radially closer to the inner wall surface 21 of the cylinder 20 than the groove bottom surface 32A is connected to the groove wall surface 32B.

The piston ring 10 is an annular component housed in the groove 32 of the piston 30. As shown in FIG. 2, an axial thickness T1 of the piston ring 10 is smaller than an axial length of the groove bottom surface 32A, and is equal to or greater than 1 mm, for example. A radial thickness T2 of the piston ring 10 is larger than a gap between the inner wall surface 21 of the cylinder 20 and the outer circumferential surface 33 of the piston 30 and smaller than a gap between the inner wall surface 21 and the groove bottom surface 32A.

Therefore, the piston ring 10 is pushed in the axial direction by the pressure of the gas G1 flowing in from the compression chamber 22 (FIG. 1), and an inner circumferential portion is brought into a state of being pressed against the bottom side groove wall surface 32B. In the piston ring 10, the inner circumferential surface is pushed radially outwards by the gas G1 (gas G1 flowing along the top side groove wall surface 32B) flowing into the groove 32, and the outer circumferential surface is pressed against the inner wall surface 21 of the cylinder 20 and brought into close contact with the inner wall surface 21. This secures the sealing effect by the piston ring 10.

The piston ring 10 includes a first ring portion 11 and a second ring portion 12 that are fitted onto the outer circumferential portion 31 of the piston 30, and has a configuration in which the first ring portion 11 and the second ring portion 12 are axially overlapped with each other. The first ring portion 11 and the second ring portion 12 are annular components configured separately from each other, and have a rectangular cross section, for example. While in the present embodiment, the first ring portion 11 and the second ring portion 12 each have the same size and shape, they are not limited thereto.

As shown in FIG. 2, the first ring portion 11 includes a first ring outer circumferential surface 11A, which slides relative to the inner wall surface 21 of the cylinder 20, a first ring inner circumferential surface 11B, which faces the side opposite to the first ring outer circumferential surface 11A in the radial direction, a first ring upper surface 11C, which receives the pressure of the gas G1 flowing in from the compression chamber 22 (FIG. 1), and a first ring lower surface 11D, which faces the side opposite to the first ring upper surface 11C in the axial direction. The second ring portion 12 includes a second ring outer circumferential surface 12A, which slides relative to the inner wall surface 21 of the cylinder 20, a second ring inner circumferential surface 12B, which faces the side opposite to the second ring outer circumferential surface 12A in the radial direction, a second ring upper surface 12C, which faces the first ring lower surface HD side, and a second ring lower surface 12D, which faces the side opposite to the second ring upper surface 12C in the axial direction.

The radial thicknesses of the first ring portion 11 and the second ring portion 12 correspond to the thickness T2 described above. The axial thicknesses of the first ring portion 11 and the second ring portion 12 are half of the thickness T1 of the entire ring described above. As shown in FIG. 2, the first ring portion 11 and the second ring portion 12 are arranged so as to be capable of abutting against each other (so that the first ring lower surface 11D and the second ring upper surface 12C abut against each other) in the same groove 32.

The first ring portion 11 has a first housed portion housed in the groove 32 in a sealed state shown in FIG. 2, and a first sliding contact portion overhanging radially outwards relative to the outer circumferential surface 33 in the sealed state and in sliding contact with the inner wall surface 21. The first housed portion is a portion having a rectangular cross section including the first inner circumferential surface 11B, and the first sliding contact portion is a portion having a rectangular cross section including the first outer circumferential surface 11A.

Similarly, the second ring portion 12 has a second housed portion housed in the groove 32 in the sealed state shown in FIG. 2, and a second sliding contact portion overhanging radially outwards relative to the outer circumferential surface 33 in the sealed state and in sliding contact with the inner wall surface 21. The second housed portion is a portion having a rectangular cross section including the second inner circumferential surface 12B, and the second sliding contact portion is a portion having a rectangular cross section including the second outer circumferential surface 12A.

As shown in FIG. 2, the second ring portion 12 is fitted onto the outer circumferential portion 31 of the piston 30 so as to be axially aligned with the first ring portion 11 and positioned on the side opposite to the compression chamber 22 (FIG. 1) in the cylinder 20 with respect to the first ring portion 11. In other words, the second ring portion 12 is arranged at a position where the first ring portion 11 is sandwiched between the second ring portion 12 and the compression chamber 22 in the axial direction.

The second ring portion 12 has hardness and strength greater than those of the first ring portion 11. Specifically, the tensile strength of the second ring portion 12 is, for example, equal to or greater than 30 MPa, and the tensile strength of the first ring portion 11 is equal to or greater than 10 MPa. The heat resistant temperature of the first ring portion 11 and the second ring portion 12 is preferably equal to or higher than 200° C., for example. The following effects can be obtained by thus positioning the second ring portion 12 having high hardness and strength on the side opposite to the compression chamber 22 (FIG. 1) with respect to the first ring portion 11.

Figure 3:
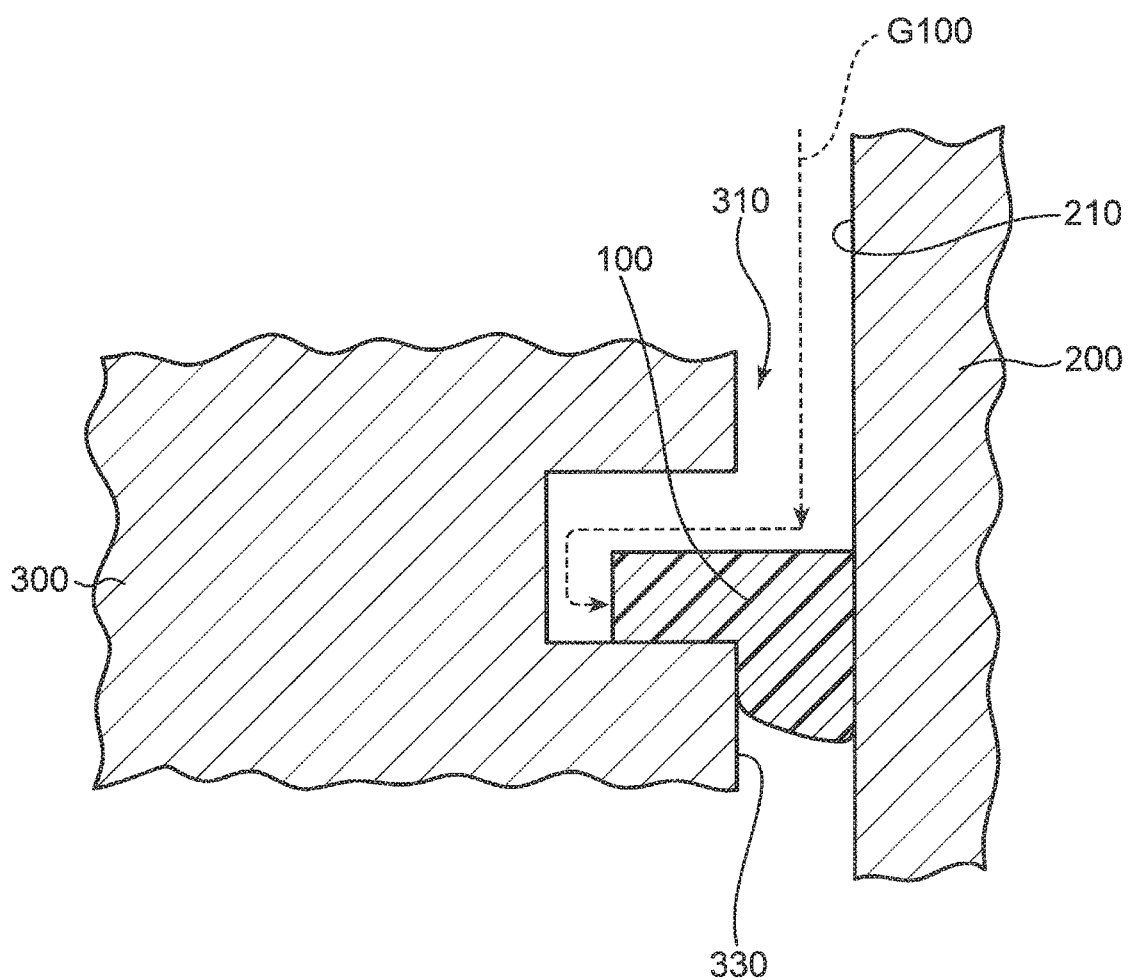
FIG. 3 is a cross sectional view schematically showing the configuration of a piston ring in a reference example.

FIG. 3 shows a state in which a gap between the outer circumferential portion 310 of the piston 300 and the inner wall surface 210 of the cylinder 200 is sealed by using the piston ring 100 of a reference example having no second ring portion. In this case, as shown in FIG. 3, the sliding contact portion (portion overhanging radially outwards relative to the outer circumferential surface 330 and in sliding contact with the inner wall surface 210) of the piston ring 100 cannot withstand the pressure of the gas G100 flowing in from the compression chamber, and deforms so as to protrude towards the low pressure side. In particular, in a compressor handling high pressure hydrogen gas as that in the present embodiment, the pressure applied to the piston ring is so large that this sort of problem is likely to occur.

On the other hand, by arranging the second ring portion 12 having high hardness and strength at the position shown in FIG. 2 (position abutting against the first ring lower surface 11D), the piston ring 10 according to the present embodiment can suppress the first ring portion 11 from deforming towards the low pressure side due to the pressure of the gas G1. More specifically, the first ring portion 11 (portion overhanging radially outwards relative to the outer circumferential surface 33), which is pushed in the axial direction (downward in FIG. 2) by the pressure of the gas G1, is supported by the second ring upper surface 12C, thereby blocking the deformation towards the low pressure side. This allows the sealing property to be secured by bringing the first ring portion 11 into close contact with the inner wall surface 21 of the cylinder 20, and damage due to deformation of the first ring portion 11 to be prevented.

Next, the constituent material of the piston ring 10 will be described in detail.

The first ring portion 11 and the second ring portion 12 contain a main component made of at least one selected from a group consisting of modified polytetrafluoroethylene (PTFE), polyaryletherketone (PAEK), polyimide (PI), and polybenzimidazole (PBI), and an additive having a carbon-filler (CF). The term "main component" means that its proportion is greater than the proportion of the additive. In a case where two or more of materials are selected from the group consisting of modified PTFE, PAEK, PI, and PBI as the main component, it is meant that the total proportion of the selected materials is greater than the proportion of the additive.

"PAEK" is a generic term for linear polymers in which benzene rings are bonded by ether and ketone, and includes polyetheretherketone (PEEK;), polyetherketone (PEK), and polyetherketoneketone (PEKK). "PI" includes the thermosetting and the thermoplastic. That is, in addition to the thermosetting polyimide, thermoplastic polyimide (TPI) such as polyetherimide (PEI) is included. "Modified PTFE" is obtained by substituting fluorine of PTFE with a predetermined functional group, and can be enhanced in strength as compared with PTFE. Examples of "CF" include graphite and carbon fiber. Examples of graphite include general graphite and nanographite. Carbon fibers include those of the polyacrylonitrile (PAN) system and the pitch (PITCH) system.

Although the amount of CF added is not particularly limited, it is preferably equal to or greater than 5% by mass to equal to or less than 40% by mass. Lubricity of the piston ring 10 can be improved by adding CF by equal to or greater than 5% by mass. On the other hand, if CF is added by greater than 40% by mass, the inner wall surface 21 of the cylinder 20 is scraped at the time of reciprocating motion of the piston 30. Therefore, the amount of CF added is preferably in the range of equal to or greater than 5% by mass to equal to or less than 40% by mass.

As an additive other than CF, for example, polyamideimide (PAI) may be further added. This allows the workability of the piston ring 10 to be enhanced. It is to be noted that the "proportion of the additive" described above means the proportion of CF in a case where the additive contains only CF, means the sum of the proportions of CF and PAI in a case where the additive contains CF and PAI. It is to be noted that the piston ring 10 according to the present embodiment does not contain PTFE as an additive.

When the piston 30 is reciprocated, the outer circumferential surface of the piston ring 10 is scraped by sliding relative to the inner wall surface 21 of the cylinder 20, and the CF of the additive adheres to the inner wall surface 21. Due to this, a low friction film made of CF is formed on the inner wall surface 21. Accordingly, both sliding surfaces (the outer circumferential surface of the piston ring 10 and the inner wall surface 21 of the cylinder 20) contain the same material (CF), and the wear resistance of the piston ring 10 can be improved.

As described above, the compressor 1 according to the present embodiment is used for pressurizing hydrogen gas in a hydrogen station. Here, if a sulfur-containing material such as polyphenylenesulfide (PPS) and molybdenum disulfide (MoS$_2$) is used as a material for the piston ring, mixing of sulfur into the hydrogen gas supplied to the fuel cell vehicle may cause a problem. On the other hand, as in the present embodiment, by forming the first ring portion 11 and the second ring portion 12 with a sulfur-free material, mixing of sulfur into the fuel cell vehicle can be prevented. Moreover, with these materials, it is possible to maintain the strength and the sliding property of the piston ring 10 at the same level as in the case of using materials such as PPS and MoS$_2$.

The first ring portion 11 and the second ring portion 12 may contain a main component made of at least one selected from the group consisting of PAEK (e.g., PEEK), PI, and PBI.

With these materials, it is possible to prevent not only sulfur but also halogen from being mixed into the hydrogen gas.

Combinations of materials constituting the main components of the first ring portion 11 and the second ring portion 12 include modified PTFE alone, PAEK alone, PI alone, PBI alone, combination of modified PTFE and PAEK, combination of modified PTFE and PI, combination of modified PTFE and PBI, combination of PAEK and PI, combination of PAEK and PSI, combination of PI and PBI, combination of modified PTFE, PAEK, and PI, combination of modified PTFE, PAEK, and PBI, combination of modified PTFE, PI, and PBI, combination of PAEK, PI, and PBI, or combination of modified PTFE, PAEK, PI, and PBI. Furthermore, "PAEK" in the above combinations may be PEEK alone, PEK alone, PEKK alone, combination of PEEK and PEK, combination of PEEK and PEKK, combination of PEK and PEKK, or combination of PEEK, PEK, and PEKK. These materials are also preferable in improving the wear resistance of the piston ring 10.

The combination of the materials described above is selected so as to satisfy the relationship that the hardness of the second ring portion 12 is greater than the hardness of the first ring portion 11 and the strength of the second ring portion 12 is greater than the strength of the first ring portion 11. As an example, the first ring portion 11 may contain a main component made of modified PTFE, and the second ring portion 12 may contain a main component made of at least one of PI and PEEK.

Figure 4:
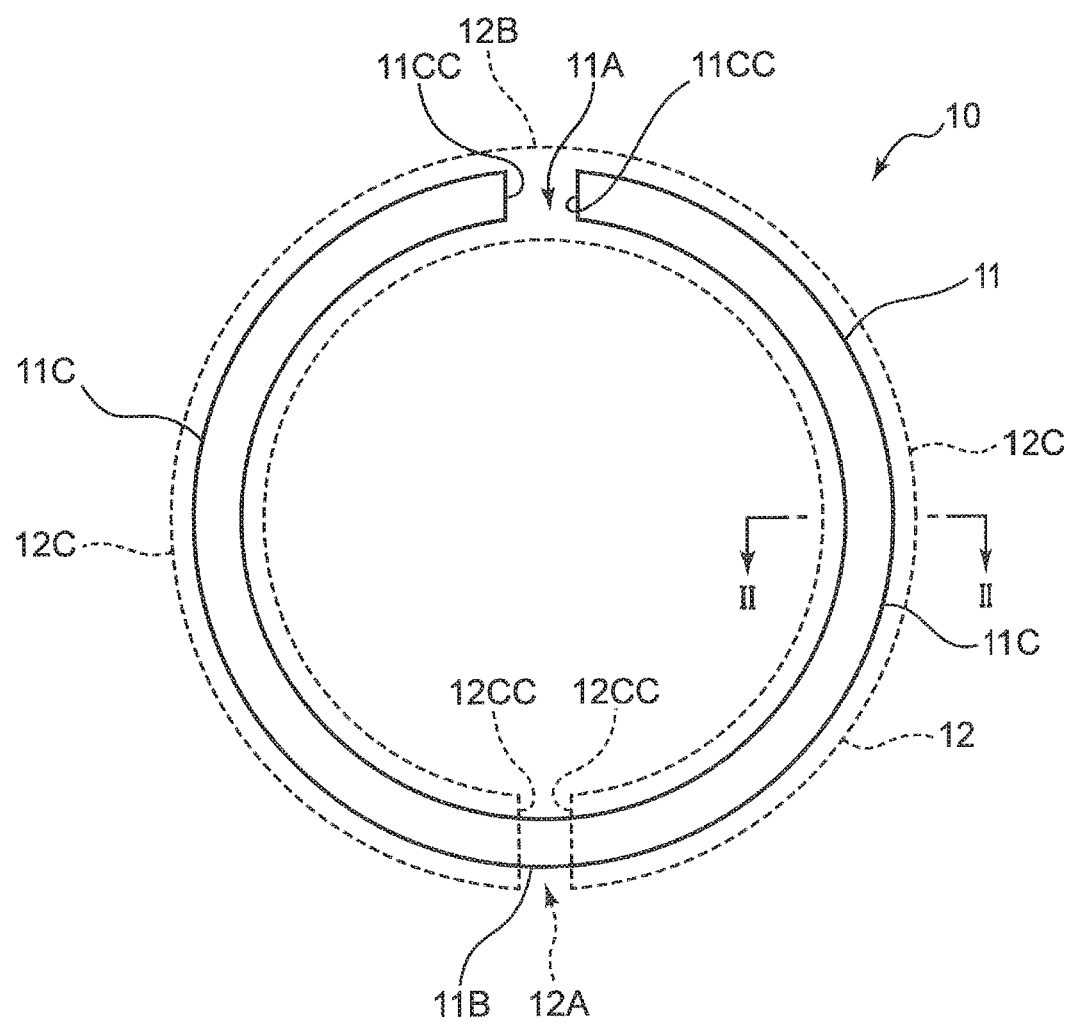
FIG. 4 is a plan view schematically showing the configuration of the piston ring according to the first embodiment of the present invention.

FIG. 4 schematically shows the configuration of the piston ring 10 in plan view from the axial direction. In FIG. 4, the first ring portion 11 is indicated by a solid line, and the second ring portion 12 is indicated by a broken line. It is to be noted that in FIG. 4, for convenience, the first ring portion 11 and the second ring portion 12 are illustrated as if they have different inner diameters and different outer diameters, but both of the ring portions have the same inner diameters and the same outer diameters. In FIG. 4, the piston 30 is not shown.

As shown in FIG. 4, the first ring portion 11 is formed with a first abutment portion 11A provided by notching a part of the circumferential direction. More specifically, the first ring portion 11 has a first base end portion 11B positioned on the side radially opposite to the first abutment portion 11A, and a pair of first arm portions 11C extending in an arc shape from the first base end portion 11B towards the first abutment portion 11A. The pair of first arm portions 11C have an arc length slightly shorter than half of the circumference of the first ring portion 11, and extend in orientations opposite to each other from the first base end portion 11B. As shown in FIG. 4, the first abutment portion 11A corresponds to a gap between first tip surfaces 11CC of the pair of first arm portions 11C.

The second ring portion 12 has basically the same shape as that of the first ring portion 11. That is, the second ring portion 12 is formed with a second abutment portion 12A provided by notching a part of the circumferential direction. More specifically, the second ring portion 12 has a second base end portion 12B positioned on the side radially opposite to the second abutment portion 12A, and a pair of second arm portions 12C extending in an arc shape from the second base end portion 12B towards the second abutment portion 12A. The pair of second arm portions 12C have an arc length slightly shorter than half of the circumference of the second ring portion 12, and extend in orientations opposite to each other from the second base end portion 12B. As shown in FIG. 4, the second abutment portion 12A corresponds to a gap between second tip surfaces 12CC of the pair of second arm portions 12C.

Thus, by forming the first abutment portion 11A in the first ring portion 11, it is possible to expand the first arm portion 11C about the first base end portion 11B, and easily expand the diameter of the first ring portion 11. This allows the first ring portion 11 to be easily fitted onto the outer circumferential portion 31 of the piston 30.

The second ring portion 12 has a portion (second base end portion 12B) that overlaps the first abutment portion 11A in the axial direction. Specifically, the second base end portion 12B axially overlaps the first abutment portion 11A so as to close the entire first abutment portion 11A when viewed from the axial direction. Due to this, the gas flowing from the compression chamber 22 (FIG. 1) into the first abutment portion 11A hits against the second ring upper surface 12C (FIG. 2) at the second base end portion 12B, thereby suppressing gas leakage to the low pressure side. Thus, the second ring portion 12 only needs to have a shape capable of closing the first abutment portion 11A, and may not exist over the entire circumference of the piston ring 10.

It is to be noted that while the description of the present embodiment has been made regarding the case where the first abutment portion 11A and the second abutment portion 12A are positioned on the sides radially opposite to each other (deviate by 180° in the circumferential direction), the present invention is not limited thereto. That is, for the purpose of obtaining the gas leakage prevention function as described above, it is sufficient that the second abutment portion 12A is present at a position circumferentially deviated from the first abutment portion 11A.

Second Embodiment

Next, a piston ring 10A according to the second embodiment of the present invention will be described with reference to FIG. 5. While the piston ring 10A according to the second embodiment has basically the configuration similar to that of the piston ring 10 according to the first embodiment and achieves the effects similar thereto, there is a difference in that the second ring portion 12 is divided into a plurality of ring elements. Hereinafter, only the difference from the piston ring 10 according to the first embodiment will be described.

Figure 5:
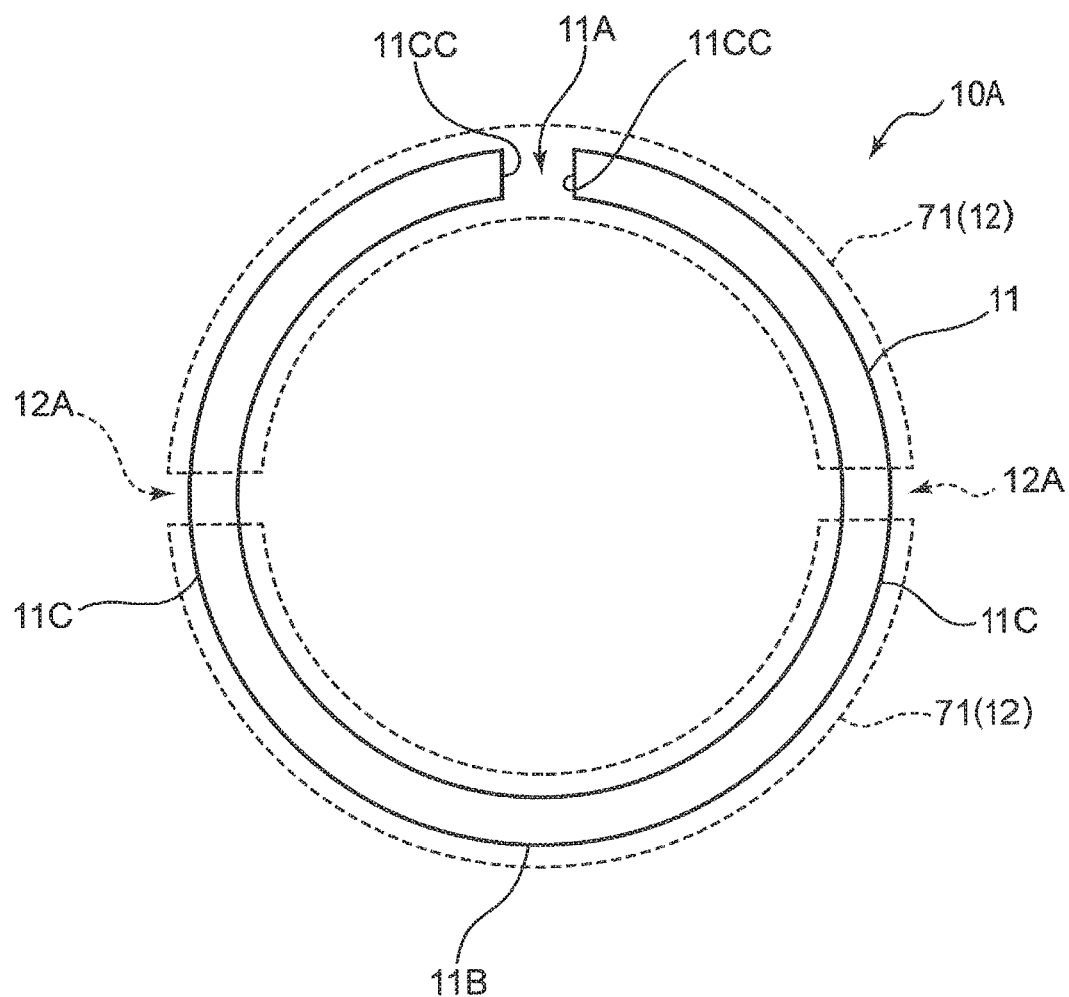
FIG. 5 is a plan view schematically showing the configuration of the piston ring according to a second embodiment of the present invention.

FIG. 5 schematically shows the configuration of the piston ring 10A in plan view from the axial direction. As shown in FIG. 5, the second ring portion 12 includes a plurality of (two in the present embodiment) circumferentially divided second ring elements 71. Each of the second ring elements 71 is a component having an arc shape extending along the circumferential direction of the second ring portion 12, and has an arc length slightly shorter than half of the circumference of the second ring portion 12.

Each of the second ring elements 71 is fitted onto the outer circumferential portion 31 of the piston 30 in a state of being housed in the groove 32 (FIG. 2). In this fitted state, the second abutment portion 12A is formed between the end surfaces of the second ring elements 71. In the present embodiment, as shown in FIG. 5, two second abutment portions 12A positioned opposite to each other in the radial direction (positioned with a circumferential deviation by 180°) are formed.

The two second abutment portions 12A are each present at a position circumferentially deviated with respect to the first abutment portion 11A (position deviated by 90°, for example). Therefore, similarly to the first embodiment, the second ring portion 12 has a portion that overlaps the first abutment portion H A in the axial direction (intermediate portion of the second ring element 71 in the upper part in FIG. 5). Therefore, the gas leakage prevention function similar to that of the first embodiment can be obtained.

The piston ring 10A according to the second embodiment has a configuration in which the second ring portion 12 is divided into the plurality of second ring elements 71, whereby the second ring portion 12 can be easily fitted onto the outer circumferential portion 31 of the piston 30. That is, with the ring shape of the first embodiment, it is necessary to greatly expand the second arm portions 12C about the second base end portion 12B, but in the second embodiment, it is possible to easily fit the second ring portion 12 onto the outer circumferential portion 31 of the piston 30 simply by putting each of the second ring elements 71 into the groove 32 of the piston 30. As described above, the second ring portion 12 has high hardness and strength, and it is difficult to expand its diameter at the time of fitting. However, ease of fitting can be secured by dividing the second ring portion 12 into the plurality of second ring elements 71 as in the second embodiment.

It is to be noted that while the description of the second embodiment has been made regarding the case where the second ring portion 12 is divided into the two second ring elements 71, the present invention is not limited to thereto, and the second ring portion 12 may be divided into three or more second ring elements 71. In addition, the present invention is not limited to the case where the size of each of the second ring elements 71 is the same, and the size of each of the second ring elements 71 may be different from each other.

Third Embodiment

Next, a piston ring 10B according to the third embodiment of the present invention will be described with reference to FIG. 6. While the piston ring 10B according to the third embodiment has basically the configuration similar to that of the piston ring 10A (FIG. 5) according to the second embodiment and achieves the effects similar thereto, there is a difference in that the first ring portion 11 is divided into a plurality of ring elements. Hereinafter, only the difference from the piston ring 10A according to the second embodiment will be described.

Figure 6:
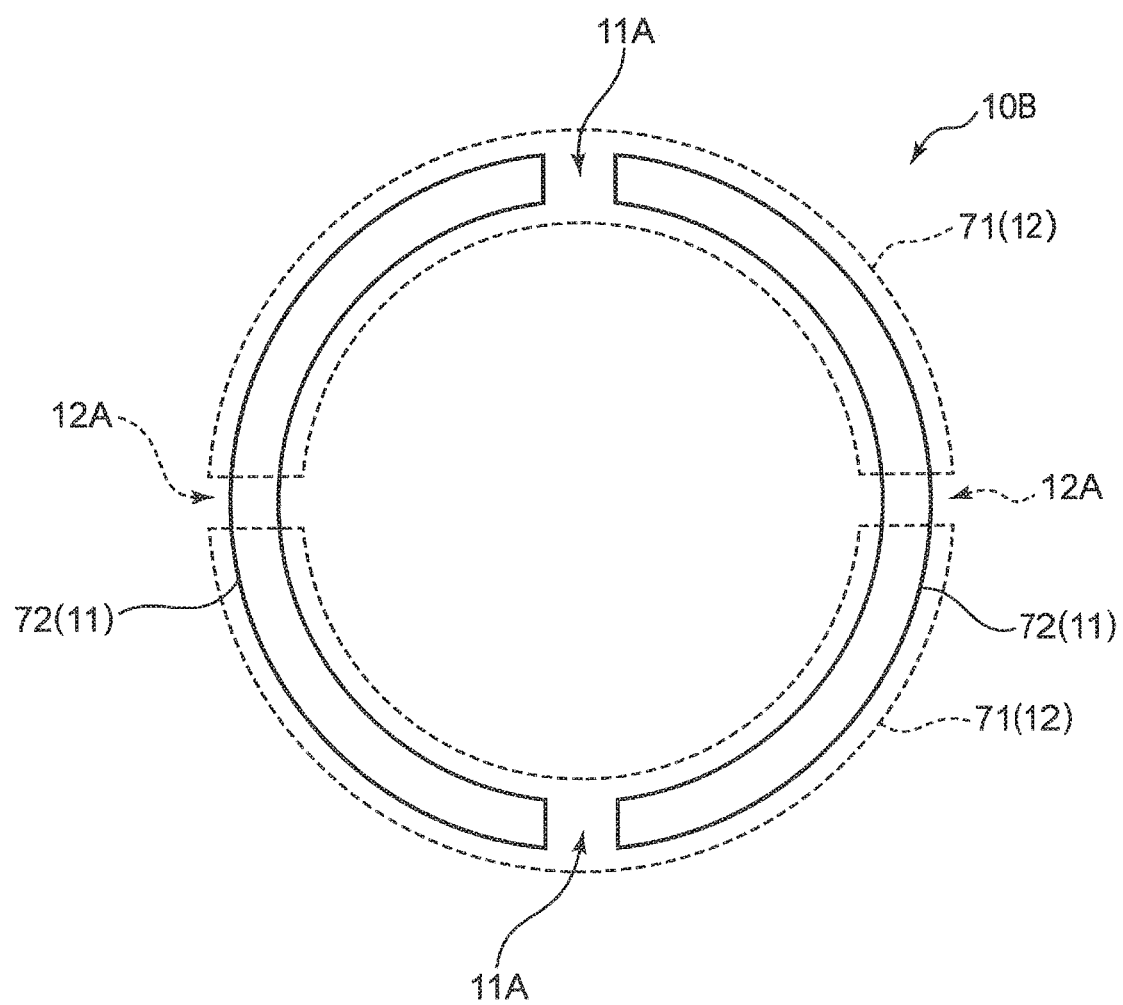
FIG. 6 is a plan view schematically showing the configuration of the piston ring according to a third embodiment of the present invention.

FIG. 6 schematically shows the configuration of the piston ring 10B in plan view from the axial direction. As shown in FIG. 6, the first ring portion 11 includes a plurality of (two in the present embodiment) circumferentially divided first ring elements 72. Each of the first ring elements 72 is a component having an arc shape extending along the circumferential direction of the first ring portion 11, and has an arc length slightly shorter than half of the circumference of the first ring portion 11.

Each of the first ring elements 72 is fitted onto the outer circumferential portion 31 of the piston 30 in a state of being housed in the groove 32 (FIG. 2). In this fitted state, the first abutment portion 11A is formed between the end surfaces of the first ring elements 72. In the present embodiment, as shown in FIG. 6, two first abutment portions 11A positioned opposite to each other in the radial direction (positioned with a circumferential deviation by 180°) are formed.

As shown in FIG. 6, the first abutment portion 11A is present at a position circumferentially deviated with respect to the second abutment portion 12A (position deviated by 90°, for example). Therefore, similarly to the second embodiment, the second ring portion 12 has a portion that overlaps the first abutment portion 11A in the axial direction (intermediate portion of each of the second ring elements 71). Therefore, the gas leakage prevention function similar to that of the second embodiment can be obtained.

According to the piston ring 10B according to the present embodiment, ease of fitting of the first ring portion 11 can also be secured by dividing the first ring portion 11 into the plurality of first ring elements 72. It is to be noted that the present invention is not limited to the case where the first ring portion 11 is divided into the two first ring elements 72, and the first ring portion 11 may be divided into three or more first ring elements 72. In addition, the present invention is not limited to the case where the size of each of the first ring elements 72 is the same, and the size of each of the first ring elements 72 may be different from each other.

In the piston ring 10B according to the third embodiment, the second ring portion 12 may not be divided into the plurality of second ring elements 71. That is, the first ring portion 11 of the third embodiment and the second ring portion 12 of the first embodiment may be combined together. Also in this case, it is preferable to adjust the position so that the second abutment portion 12A does not overlap the first abutment portion 11A in the axial direction.

The embodiment described above is outlined as follows.

The piston ring according to the above embodiment is for sealing a gap between the outer circumferential portion of the piston and the inner wall surface of the cylinder, in a compressor provided with the cylinder and the piston reciprocating in the axial direction in the cylinder. The piston ring includes a first ring portion which is fitted onto the outer circumferential portion of the piston and which is capable of sliding relative to the inner wall surface of the cylinder, and a second ring portion which is fitted onto the outer circumferential portion of the piston, arranged side-by-side with the first ring portion in the axial direction, and which is capable of sliding relative to the inner wall surface of the cylinder. The second ring portion is fitted onto the outer circumferential portion of the piston in such a way as to be positioned on a side opposite to a compression chamber inside the cylinder, relative to the first ring portion, and has a greater hardness than the first ring portion has.

This piston ring is fitted onto the outer circumferential portion of the piston in a state where the first ring portion and the second ring portion are axially aligned with each other and the second ring portion is positioned on the side opposite to the compression chamber with respect to the first ring portion. Then, the second ring portion has a greater hardness than the first ring portion has. Therefore, even if gas flows from the compression chamber into the gap between the outer circumferential portion of the piston and the inner wall surface of the cylinder, deformation of the first ring portion having received pressure of the gas to the low pressure side can be suppressed by the second ring portion. Accordingly, the piston ring according to the above embodiment can prevent damage due to deformation of the first ring portion, and can more reliably seal the gap between the outer circumferential portion of the piston and the inner wall surface of the cylinder.

The term "hardness" used herein means, for example, Rockwell hardness (symbol HR) or durometer hardness (symbols IIDA, HDD, and HDE). The Rockwell hardness is measured by a method in conformance with JIS K7202-2 or JIS 22245. The durometer hardness is measured by a method in conformance with JIS K6253 or JIS K7215, It is to be noted that the hardness may be measured by another test method such as Vickers hardness.

In the piston ring, the first ring portion and the second ring portion may be arranged so as to be capable of abutting against each other in the same groove formed so as to be recessed in an orientation away from the inner wall surface of the cylinder on the outer circumferential portion of the piston.

According to this configuration, deformation of the first ring portion can be more reliably prevented by arranging the second ring portion so as to be capable of abutting against the first ring portion.

In the piston ring described above, the second ring portion may include a plurality of circumferentially divided ring elements each fitted onto the outer circumferential portion of the piston.

According to this configuration, the piston ring can be fitted onto the outer circumferential portion of the piston more easily than in the case where the second ring portion is configured by a single ring element. That is, while the hardness of the second ring portion is so great that it is difficult to fit a single ring element by expanding the diameter thereof, it is possible to secure ease of fitting by dividing the second ring portion into a plurality of ring elements as described above.

In the piston ring described above, the first ring portion may be formed with an abutment portion provided by notching a part of the circumferential direction. The second ring portion may have a portion that overlaps the abutment portion in the axial direction.

According to this configuration, by forming the abutment portion in the first ring portion, it is possible to easily fit the first ring portion onto the outer circumferential portion of the piston by expanding the diameter of the first ring portion. Moreover, since the second ring portion has a portion that overlaps the abutment portion of the first ring portion in the axial direction, it is possible to prevent the gas flowing from the compression chamber into the abutment portion of the first ring portion from leaking to the low pressure side.

The piston ring described above may be for sealing a gap between the outer circumferential portion of the piston and the inner wall surface of the cylinder, in the compressor for a hydrogen station. The first ring portion and the second ring portion may contain a main component made of at least one selected from the group consisting of modified polytetrafluoroethylene, polyaryletherketone, polyimide, and polybenzimidazole, and an additive having a carbonfiller.

Materials for the piston ring in the compressor for a hydrogen station include a sulfur-containing material such as polyphenylenesulfide and molybdenum disulfide. However, when a piston ring formed of these sulfur-containing materials is used, sulfur may be mixed into the hydrogen gas supplied to the fuel cell vehicle.

On the other hand, as described above, by using of a sulfur-free material as the main component or the additive of the first ring portion and the second ring portion, mixing of sulfur into the fuel cell vehicle can be prevented. Moreover, with these materials, it is possible to maintain the strength and the sliding property of the piston ring at the same level as in the case of using a sulfur-containing material such as polyphenylenesulfide and molybdenum disulfide.

In the piston ring described above, the first ring portion and the second ring portion may contain a main component made of at least one selected from the group consisting of polyaryletherketone, polyimide, and polybenzimidazole.

By forming the main components of the first ring portion and the second ring portion with the materials described above, it is possible to prevent halogen from being mixed into the fuel cell vehicle.

In the piston ring described above, the first ring portion may contain a main component made of modified polytetrafluoroethylene. The second ring portion may contain a main component made of at least one of polyimide and polyetheretherketone.

By using the materials described above as a main component, it is possible to further enhance the strength and the sliding property of the piston ring.

The compressor according to the embodiment described above includes the cylinder having the compression chamber for pressurizing gas, the piston reciprocating in the axial direction in the cylinder so as to change the volume of the compression chamber, and the piston ring fitted onto the outer circumferential portion of the piston so as to seal a gap between the outer circumferential portion of the piston and the inner wall surface of the cylinder.

According to this compressor, by using the piston ring according to the above embodiment, it is possible to more reliably seal the gap between the outer circumferential portion of the piston and the inner wall surface of the cylinder.

In the compressor, the cylinder may be made of a steel material containing Cr.

The compressor provided with the cylinder made of the steel material described above is particularly preferable for the purpose of handling hydrogen gas.

In the compressor described above, the arithmetic average roughness on the inner wall surface of the cylinder may be equal to or less than 0.8.

This enables the piston ring to smoothly slide relative to the inner wall surface of the cylinder at the time of reciprocating motion of the piston.

It is to be understood that the embodiments disclosed herein are illustrative in all respects and not restrictive. The scope of the present invention is indicated by not the description described above but the scope of claims, and is intended to include meanings equivalent to the scope of claims and all modifications within the scope.

The invention claimed is:
1. A compressor for a hydrogen station, comprising:
a cylinder having a compression chamber for pressurizing gas;
a piston reciprocating in an axial direction in the cylinder so as to change a volume of the compression chamber; and
a piston ring fitted onto an outer circumferential portion of the piston so as to seal a gap between the outer circumferential portion of the piston and an inner wall surface of the cylinder; the piston ring comprising:

a first ring portion which is fitted onto the outer circumferential portion of the piston and which is capable of sliding relative to the inner wall surface of the cylinder; and a second ring portion which is fitted onto the outer circumferential portion of the piston, arranged side-by-side with the first ring portion in the axial direction, and which is capable of sliding relative to the inner wall surface of the cylinder, wherein the second ring portion is fitted onto the outer circumferential portion of the piston in such a way as to be positioned on a side opposite to the compression chamber inside the cylinder, relative to the first ring portion, and has a greater hardness than the first ring portion;

wherein the first ring portion and the second ring portion contain
a main component made of at least one selected from a group consisting of modified polytetrafluoroethylene, polyaryletherketone, polyimide, and polybenzimidazole, and
an additive having a carbonfiller; and wherein the first ring portion and the second ring portion do not contain sulfur.

2. The compressor according to claim 1, wherein the first ring portion and the second ring portion are arranged so as to be capable of abutting against each other in a same groove formed so as to be recessed in an orientation away from the inner wall surface of the cylinder on the outer circumferential portion of the piston.

3. The compressor according to claim 2, wherein the second ring portion includes a plurality of circumferentially divided ring elements each fitted onto the outer circumferential portion of the piston.

4. The compressor according to claim 2, wherein
the first ring portion is formed with an abutment portion provided by notching a part of a circumferential direction, and
the second ring portion has a portion that overlaps the abutment portion in the axial direction.

5. The compressor according to claim 1, wherein the second ring portion includes a plurality of circumferentially divided ring elements each fitted onto the outer circumferential portion of the piston.

6. The compressor according to claim 1, wherein
the first ring portion is formed with an abutment portion provided by notching a part of a circumferential direction, and
the second ring portion has a portion that overlaps the abutment portion in the axial direction.

7. The compressor according to claim 1, wherein the first ring portion and the second ring portion contain a main component made of at least one selected from a group consisting of polyaryletherketone, polyimide, and polybenzimidazole.

8. The compressor according to claim 1, wherein
the first ring portion contains a main component made of modified polytetrafluoroethylene, and
the second ring portion contains a main component made of at least one of polyimide and polyetheretherketone.

9. The compressor according to claim 1, wherein an arithmetic average roughness on the inner wall surface of the cylinder is equal to or less than 0.8.

* * * * *